Patented June 6, 1939

2,161,392

UNITED STATES PATENT OFFICE 2,161,392

POLYMERIZATION OF OLEFINS

Donald R. Stevens, Swissvale, and William A. Gruse, Wilkinsburg, Pa., assignors to Gulf Research & Development Company, Pittsburgh, Pa., a corporation of Delaware No Drawing. Application November 3, 1936, Serial No. 109,026

2 Claims. (Cl. 196—10)

Our invention relates to the polymerization of olefins; and more particularly to a process of polymerizing normally gaseous olefins having three to four carbon atoms per molecule by subjecting the same to the catalytic and polymerizing action of a mixture of a major amount of phosphoric acid and a minor amount of sulfuric acid; all as more fully set forth hereinbelow and as claimed.

Sulfuric acid has long been known as a catalyst for olefin polymerization, especially for the polymerization of iso-butylene, but in concentrated form is too strong; the polymers tend to be too high-boiling and destructive side reactions occur. When diluted to a point where undesirable side reactions are suppressed, sulfuric acid loses its polymerizing effect upon olefins other than iso-butylene itself. Inasmuch as, except for the manufacture of di- or tri- iso-butylene or mixtures thereof in substantially pure form, the refiner who is interested in gas polymerization desires also to polymerize the other butenes and propylene, all of which are present in refinery cracked gases, sulfuric acid alone is far from an ideal agent for obtaining maximum yields of motor fuel from olefinic refinery gases.

Among the various processes and proposals for the polymerization of gaseous olefins which have attracted attention in the past few years are those employing a catalyst consisting primarily of phosphoric acid. Phosphoric acid has certain advantages over sulfuric acid; it is a somewhat weaker acid, and the tendencies toward "over-polymerization" and undesirable side reactions are less with phosphoric acid than with sulfuric acid. But it also has its own disadvantages. There are various interconvertible forms of phosphoric acid, such as the meta-, pyro-, and ortho-acids, and their chemical and physical properties differ. Their respective esters are also different and do not have the same volatility characteristics. In the practical operation of a phosphoric-acid type gas-polymerization process, this fact gives rise to some operating difficulties, especially at the elevated temperatures which are required for practical results. All other forms of phosphoric acid tend to go over to the meta form by loss of water and in operating with dry hydrocarbon vapors the tendency towards production of meta-acid is great. It is difficult or impossible to insure the absence of the meta-acid and maintain the acid entirely in other forms. It has been observed by workers in this field that the meta-acid is substantially ineffective as a polymerization catalyst in this type of process, and also that it volatilizes, causing a loss of the catalyst. Our own observations lead us to believe that volatile esters of the meta-acid also, at least in part, result in loss of the catalyst but the ultimate result is the same; the catalyst is depleted, and the resulting polymers contain acidic constituents volatilized in the course of the process. Adding water vapor to the gases prior to contact with the catalyst is only a partly effective expedient to overcome this disadvantage. Avoidance of the formation of meta-acid and preservation of either of the other forms at any temperature requires rather a delicate balance between the water in the vapor mixture and that in the acids.

The alkylation of aromatic or similarly reactive hydrocarbons, such as benzol, with olefinic gases in the presence of catalytic agents comprising mixtures of phosphoric and sulfuric acids has also been proposed. The proponents thereof have indicated preference for a mixture of 60 per cent of phosphoric acid (of 85 per cent strength) and 40 per cent of sulfuric acid (of 96 per cent strength), at least for alkylation with n-butylene. They state that with this mixed-acid catalyst, and at operating temperatures around 60° C., there is a practical minimum of polymerizing reactions, though the latter are not entirely obviated.

We have found, however, that at higher temperatures of from 100° to 250° C. or somewhat higher, and in the absence of aromatics, gaseous olefins of three and four carbon atoms per molecule may be advantageously polymerized, with good yields, by contact with a catalyst comprising a mixture of phosphoric and sulfuric acids, the sulfuric acid being present in the mixture in an amount equal to from 1 to 10 per cent of the phosphoric acid.

With such a catalyst, and under the conditions noted, we are able to overcome disadvantages inherent in the use of sulfuric acid alone or phosphoric acid alone. Side reactions are minimized, and there is obtained a larger yield of polymer for a given catalyst consumption. $P_2O_5$ is carried over into the final polymer, if at all, to a much smaller extent than is true when phosphoric acid alone is employed under similar conditions. It is unnecessary to theorize upon whether the $H_2SO_4$ acts to inhibit or reduce formation of meta-phosphoric acid, or whether the $H_2SO_4$ serves to suppress ionization of the phosphoric acid or acids, thereby preventing the formation of volatile and oil-soluble esters; the observed fact is that the catalyst is not carried over into the polymer condensate to as great an extent, or at as high a rate, as in the use of phosphoric acid alone.

In preparing the catalyst, we have found it advantageous to employ concentrated acids, for example phosphoric acid of 85 per cent strength or more, and sulfuric acid of 90 per cent strength or more, preferably 95 to 96 per cent. If acids of lower strength are employed, the mixture may be concentrated to the desired strength prior to use.

The acid mixture is preferably, for contact purposes, distributed upon a suitable solid of large surface area, such as pumice, acid-treated clay, ceramic material or the like. Glass beads may be used, but they do not retain the acid as well. The contact material is advantageously disposed in a suitable tower, through which the preheated gases are passed; the effluent gases and vapors then pass to a condenser or absorber for recovery of the polymers. The operation is advantageously conducted under a pressure of from 50 to 500 pounds per square inch. In order to obtain high yields, it is sometimes advantageous to employ a series of catalyst stages. Recycling of effluent gases is ordinarily not desirable except in the case of gases of high olefin-concentration.

Fresh catalyst is supplied from time to time as required, and any acid draining from the contact zone is recirculated. Steps should be taken to maintain the desired acid concentration, as by adjusting the water content of the recirculated acid or by adjusting the moisture content of the inlet gases.

The gas charged may consist of individual olefins, such as propylene or any of the butylenes, or a mixture thereof. A refinery "butane cut", consisting largely of $C_3$ and $C_4$ hydrocarbons, represents an excellent starting material.

In the following examples, such a butane cut was passed over pumice, saturated in Run No. 1 with a mixture of 3 parts by volume of ordinary concentrated sulfuric acid and 97 parts by volume of ordinary ortho-phosphoric acid of 85 per cent strength, and in Run No. 2 with the ortho-phosphoric acid alone. Comparative results were obtained as follows:

|  | Run No. 1 | Run No. 2 |
|---|---|---|
| Temperature, °C | 175–180 | 175–180 |
| Pressure, lbs. per sq. in | 200 | 200 |
| Time of contact, minutes | 4 | 4–7 |
| Polymer yield, grams | 6452.7 | 3492 |
| Grams polymer per cc. catalyst | 8.1 | 4.4 |
| KOH required per 100 cc. of polymer to neutralize acid liberated on hydrolysis of contained ester; mg.— | | |
| At start | 6.5 | 30.6 |
| At end | 8.33 | 15.3 |

It will be noted that the catalyst in Run No. 1 produced nearly twice as much polymer as that in Run No. 2, and that the content of acidic material carried over into the polymer was considerably less in Run No. 1 than in Run No. 2, thus showing that in employing our improved process, the life of the catalyst is prolonged as compared with the life of the catalyst when using phosphoric acid alone.

The polymers recovered in Run No. 1 were of excellent quality, of high "octane number" or anti-knock value, and boiling mainly within a true gasoline boiling-point range. No objectionable side reactions were observed. The yields of polymers, based upon the amount of gases employed, were substantially the same in both runs mentioned.

Wherever the gases to be employed contain sulfur in such form or in such amount as to give a polymer difficult to refine in any of the ordinary manner, it is advisable to subject the gases to a desulfurizing treatment prior to contacting them with the catalyst. Various desulfurizing methods are available, and do not require description here. Ordinarily, the polymers need only simple alkali and water washes for refining purposes.

Various modifications in the details of operation over those set forth herein will undoubtedly suggest themselves to those skilled in the art and are within the contemplation and scope of our invention, which may be variously practiced and embodied within the scope of the claims hereinafter made.

What we claim is:

1. A process of polymerizing normally gaseous olefins which comprises subjecting such olefins to contact with a mixture of sulfuric and phosphoric acids at a temperature of from 100° to 250° C., said mixture consisting of from 1 to 10 per cent by volume of concentrated sulfuric acid and from 99 to 90 per cent of strong phosphoric acid.

2. A process of polymerizing normally gaseous olefins comprising subjecting such olefins to contact with a mixture consisting of 3 per cent of concentrated sulfuric acid and 97 per cent of orthophosphoric acid, at a temperature of from 100° to 250° C.

DONALD R. STEVENS.
WILLIAM A. GRUSE.